(12) United States Patent
Chu et al.

(10) Patent No.: US 11,891,293 B2
(45) Date of Patent: Feb. 6, 2024

(54) SMART ENERGY-SAVING DEVICE FOR AUTOMATIC BLENDING DRINKS

(71) Applicant: Chien-Jung Chu, Kaohsiung (TW)

(72) Inventors: Chien-Jung Chu, Kaohsiung (TW); Fei-Teng Ko, New Taipei (TW); Chang-Hsi Wu, Kaohsiung (TW)

(73) Assignee: Chien-Jung Chu, Kaohsiung (TW)

( * ) Notice: Subject to any disclaimer, the term of this patent is extended or adjusted under 35 U.S.C. 154(b) by 279 days.

(21) Appl. No.: 17/540,261

(22) Filed: Dec. 2, 2021

(65) Prior Publication Data

US 2022/0177291 A1 Jun. 9, 2022

(30) Foreign Application Priority Data

Dec. 7, 2020 (TW) .................... 109143040

(51) Int. Cl.
| | |
|---|---|
| *B67D 1/08* | (2006.01) |
| *B67D 1/00* | (2006.01) |
| *A47J 31/41* | (2006.01) |
| *A47J 31/52* | (2006.01) |
| *F25C 5/20* | (2018.01) |
| *F25C 5/18* | (2018.01) |

(52) U.S. Cl.
CPC ............ *B67D 1/0026* (2013.01); *A47J 31/41* (2013.01); *A47J 31/5251* (2018.08); *A47J 31/5255* (2018.08); *B67D 1/0801* (2013.01); *F25C 5/18* (2013.01); *F25C 5/20* (2018.01); *B67D 2001/0811* (2013.01); *B67D 2210/00123* (2013.01)

(58) Field of Classification Search
CPC .... A47J 31/40; A47J 31/4492; A47J 31/5251; A47J 31/5255; A47J 31/41; B67D 1/10; B67D 1/0888; B67D 1/0041; B67D 1/0026; F25C 5/18; F25C 5/20
USPC ....................... 222/129.4, 1, 145.6, 145.5, 23
See application file for complete search history.

(56) References Cited

U.S. PATENT DOCUMENTS

| | | | | |
|---|---|---|---|---|
| 9,155,330 | B1 * | 10/2015 | Shtivelman | A47J 43/046 |
| 10,791,752 | B2 * | 10/2020 | Siegel | A23L 2/54 |
| 11,661,327 | B2 * | 5/2023 | Bergmann | G07F 13/065 |
| | | | | 222/23 |
| 2011/0049180 | A1 * | 3/2011 | Carpenter | B67D 1/0031 |
| | | | | 222/145.6 |
| 2011/0264285 | A1 * | 10/2011 | Mattos, Jr. | B67D 1/0041 |
| | | | | 700/283 |

(Continued)

FOREIGN PATENT DOCUMENTS

| | | |
|---|---|---|
| CN | 210961500 U | 7/2020 |
| TW | M547348 U | 8/2017 |

*Primary Examiner* — Charles P. Cheyney
(74) *Attorney, Agent, or Firm* — Best & Flanagan LLP

(57) ABSTRACT

A smart energy-saving device for automatic blending drinks, adopted to inject beverages into at least one beverage cup that comprises a bar code, comprises: beverage barrels; manifolds; at least one ice-storing device including at least one ice outlet, at least one servomotor, a stirring rod, and at least one thruster; beverage stations; collection mechanisms including ring structures, ice inlets, water inlets, and beverage tubes; and a control module including flowmeters, water valve switches, beverage-cup-weight sensors, beverage-barrel-weight sensors, at least one ice-beverage-barrel-weight sensor, pressure sensors, bar code readers, infrared scanners; and a controller.

10 Claims, 6 Drawing Sheets

(56) References Cited

U.S. PATENT DOCUMENTS

| | | | |
|---|---|---|---|
| 2013/0292407 A1* | 11/2013 | Beavis | F04B 13/00 |
| | | | 222/23 |
| 2015/0144653 A1* | 5/2015 | Kline | G07F 9/001 |
| | | | 222/23 |
| 2016/0264394 A1* | 9/2016 | Hershberger | G01G 19/52 |
| 2018/0132507 A1* | 5/2018 | Siegel | A47J 31/40 |
| 2018/0332997 A1* | 11/2018 | Kang | A47J 31/525 |
| 2022/0185651 A1* | 6/2022 | Bergmann | G07F 13/065 |

* cited by examiner

SMART ENERGY-SAVING DEVICE FOR AUTOMATIC BLENDING DRINKS

BACKGROUND OF THE INVENTION

1. Field of the Invention

The present invention is in related to a drink blending device, more particularly to a smart energy-saving device for automatic blending drinks.

2. Description of the Prior Art

The beverage industry is one of the most important industries in Taiwan. According to statistics from the Ministry of Economic Affairs of Taiwan, the beverage shops have grown up for 14 consecutive years. However, the beverage shops themselves still have many business difficulties, the most difficulty is personnel. The turnover rate of the beverage shops is high, and revenue is also easily affected by labor costs. In order to solve the manpower problem, related industries have also launched different types of beverage automation equipment. On the other hand, these types of beverage automation equipment still exist many problems.

The structure being complicated causes that the costs of manufacturing and maintenance are very high. For example, moving beverage cup through conveyor or mechanical arm will rise up the costs of manufacturing and maintenance in the aspect of equipment, although it is approaching to unmanned operation. On the other hand, the electricity cost is also an important issue to the all-day beverage shops. Additionally, conveyor and mechanical arm make the situation of high electricity consumption, so as to cause an expensive expense.

The beverage preparation equipment with conveyor or mechanical arm adopts multiple stations, therefore a beverage cup may be through multiple supply stations for adding beverages, sugar, ice cubes, etc. For avoiding the conditions of beverage overturned or overflowed in the preparation, the speed of conveyor or mechanical arm is thus limited in a range. As a matter of fact, the efficiency of blending beverages may not catch up with passenger flow rate, so that the preparation rate is an important indicator for those beverage shops. Especially, the beverage consumption habits in the most countries are mainly to go, not for here. Hence, it is obvious that conveyor or mechanical arm is out of date.

The accuracy of beverage outflow is not good enough. Most of the traditional automatic beverage machines choose flow meters and solenoid valves, and the power-on time is a standard reference to control the opening time of the solenoid valve. Depending on the way as aforesaid, the accuracy may be 13c.c., that is not as good as the market needs. Also, the conditions of beverage overturned or overflowed in the preparation happen all the time. Besides, some of the equipment adopt plastic pipelines to deliver beverages, but plastic pipeline may have bending parts that cause the internal pressure being not average, so as to affect the amount of beverage outflow.

As it can be seen, how to solve aforesaid shortcomings becomes an important issue to persons who are skilled in the art.

SUMMARY OF THE INVENTION

The present invention is to provide a smart energy-saving device for automatic blending drinks, which solves the traditional shortcomings of complicated structure, high maintenance cost, rough outflow amount of beverages, low beverage preparation efficiency, etc.

The smart energy-saving device for automatic blending drinks, adopted to inject beverages into at least one beverage cup that comprises a bar code, comprises that of: a plurality of beverage barrels, each having at least one outlet disposed at a plurality of bottoms of the beverage barrels; a plurality of manifolds, connected with the outlet, arranged to be parallel to each other, and an angle between a horizontal line and an extension direction of the manifolds; at least one ice-storing device, comprising: at least one ice outlet, disposed at a bottom of the ice-storing device; at least one servomotor; a stirring rod, one end thereof disposed at a top of the ice-storing device; and at least one thruster, horizontally disposed beyond the ice outlet and connected with the servomotor; a plurality of beverage stations, each being suitable for placing the beverage cup thereon and having a U-shape structure; a plurality of collection mechanisms, disposed beyond the beverage stations, comprising: a plurality of ring structures; a plurality of ice inlets, each being disposed at a top of the ring structure and connected with the ice outlet; a plurality of water inlets, each being disposed on a side of the ring structures; and a plurality of beverage tubes, both ends of each of the beverage tube being connected with the water inlet and the manifold respectively; and a control module, comprising: a plurality of flowmeters, each being disposed on the beverage tube and adopted to produce flow data; a plurality of water valve switches, each being disposed on the beverage tube and connected with the flowmeter in series; a plurality of beverage-cup-weight sensors, each being disposed on the beverage station and adopted to produce a beverage-cup-weight datum; a plurality of beverage-barrel-weight sensors, each being disposed at a bottom of the beverage barrel and adopted to produce a beverage-barrel-weight datum; at least one ice-beverage-barrel-weight sensor, disposed at the bottom of the ice-storing device and adopted to produce an ice-beverage-barrel-weight datum; a plurality of pressure sensors, each being disposed in the manifold and adopted to produce a beverage pressure datum; a plurality of bar code readers, each being disposed on the U-shape structure and adopted to recognize the bar code for acquiring beverage data; a plurality of infrared scanners, each being disposed on the U-shape structure and adopted to produce beverage-cup-position data; and a controller, connected with the water valve switches, the flowmeters, the beverage-cup-weight sensors, the beverage-barrel-weight sensors, the ice-beverage-barrel-weight sensor, the infrared scanners, the pressure sensors, and the bar code readers, and receiving the flow data, the beverage-cup-weight datum, the beverage-barrel-weight datum, the ice-beverage-barrel-weight datum, the beverage pressure datum, the beverage data, and the beverage-cup-position data, and simultaneously controlling the plurality of water valve switches and the servomotor based on the flow data, the beverage-cup-weight datum, the beverage-barrel-weight datum, the ice-beverage-barrel-weight datum, the beverage pressure datum, the beverage data, and the beverage-cup-position data; wherein each of the beverage barrels is connected with the plurality of collection mechanisms through the single manifold.

Preferably, the smart energy-saving device for automatic blending drinks further comprises a sealing machine, which is disposed behind the beverage stations and below the ice-storing device.

Preferably, the smart energy-saving device for automatic blending drinks further comprises a sound device, which is connected to the controller and adopted to play a beverage replenishment notification message, an ice replenishment notification message, and an abnormality notification message.

Preferably, the beverage barrel further has a water inlet, disposed beyond the beverage barrel and connected with an outside water source, and a beverage barrel cleaning water valve switch, connected with the water inlet in series, wherein the controller is electrically connected with the beverage barrel cleaning water valve switch, so that the beverage barrel cleaning water valve switch is activated as soon as the controller receives a system cleaning instruction.

Preferably, each of the collection mechanisms further comprises a plurality of nozzles and a collection mechanism clean water valve switch, the nozzle being disposed on the ring structure and connected with an outside water source, the collection mechanism clean water valve switch being connected with the nozzle in series, so that the collection mechanism clean water valve switch is activated as soon as the controller receives a collection mechanism cleaning instruction.

Preferably, the smart energy-saving device for automatic blending drinks further comprises a sales information printing device, which is adopted to input the beverages and generate the bar code, wherein the bar code is printed on a label.

Preferably, the smart energy-saving device for automatic blending drinks further comprises a wireless communication module, which is connected with the controller and adopted to transfer the ice-barrel-weight datum, the beverage-barrel-weight datum, the beverage-cup-position data, and the beverage data to an outside electronic device and an outside display.

Preferably, the ice outlet, the servomotor and the thruster are multiple and the same number.

A method for smart automatic blending drinks comprises the steps of:
 (A10) providing the smart energy-saving device, and receiving the beverage-cup-position data, in order to determine whether the beverage cup is on the beverage station;
 (A20) if yes, activating the bar code reader;
 (A30) acquiring the bar code through the bar code reader, in order to gain the beverage data via the bar code;
 (A40) driving the corresponding water valve switch and the servomotor;
 (A50) obtaining the beverage-barrel-weight datum and the beverage pressure datum, then comparing with a preset beverage weight for determining a beverage weight difference, so as to control a first outflow amount of the water valve switch;
 (A60) controlling a second outflow amount of the water valve switch according to the first outflow amount;
 (A70) gaining the beverage-barrel-weight datum and the ice-barrel-weight datum, in order to control a third outflow amount of the water valve switch; and
 (A80) determining the beverage-cup-weight datum being equal to the preset beverage weight, if no, repeating step (A50) to step (A80), otherwise, deactivating the water valve switch.

Preferably, the method for smart automatic blending drinks further comprises the steps of:
 acquiring the beverage-barrel-weight datum, and generating a beverage replenishment notification message if the beverage-barrel-weight datum is less than a corresponding preset beverage-barrel-weight datum;
 acquiring the ice-barrel-weight datum, and generating an ice replenishment notification message if the ice-barrel-weight datum is less than a preset ice-barrel-weight datum;
 acquiring the beverage-cup-weight datum after step (A80), and generating an abnormality notification message if the beverage-cup-weight datum is less than a corresponding preset beverage-cup-weight datum; and
 generating the abnormality notification message from step (A10) to step (A80), if any of the flow data, the beverage-cup-weight datum, the beverage-barrel-weight datum, the ice-beverage-barrel-weight datum, the beverage pressure datum, the beverage data, and the beverage-cup-position data is not received in a certain time period.

Compared with the prior arts, the present invention has the following advantages of:
 1. Finishing preparations of beverages in a single station without conveyor, mechanical arm, etc., so as to promote efficiency and save energy.
 2. By way of the multiple sensors, the beverage being prepared and simultaneously the output amount of the beverages being controlled by means of a feedback function, so as to more accurately control the output amount of the beverages up to 2c.c.
 3. Having the functions of fault detection and automatic cleaning, and forwarding the messages in case of malfunction or insufficient raw materials.
 4. Cooperation with outside electronic device or display to present the information of raw materials for operator to monitor.
 5. Having the features of high efficiency, energy-saving and facilitation to operate, so as to be suitable to beverage shops.

Other and further features, advantages, and benefits of the invention will become apparent in the following description taken in conjunction with the following drawings. It is to be understood that the foregoing general description and following detailed description are exemplary and explanatory but are not to be restrictive of the invention.

The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

In order to describe in detail the technical content, structural features, achieved objectives and effects of the instant application, the following detailed descriptions are given in conjunction with the drawings and specific embodiments. It should be understood that these embodiments are only used to illustrate the application and not to limit the scope of the instant application.

The present invention provides a smart energy-saving device for automatic blending drinks, which adopts a single station in the aspect of structure without conveyor or mechanical arm, but with efficient promotion. Another feature of scanning a bar code is able to automatically blend drinks, and the algorithm of a feed-back control is capable of precisely controlling the outflow amount of beverages up to 2c.c.

Figure 1A:
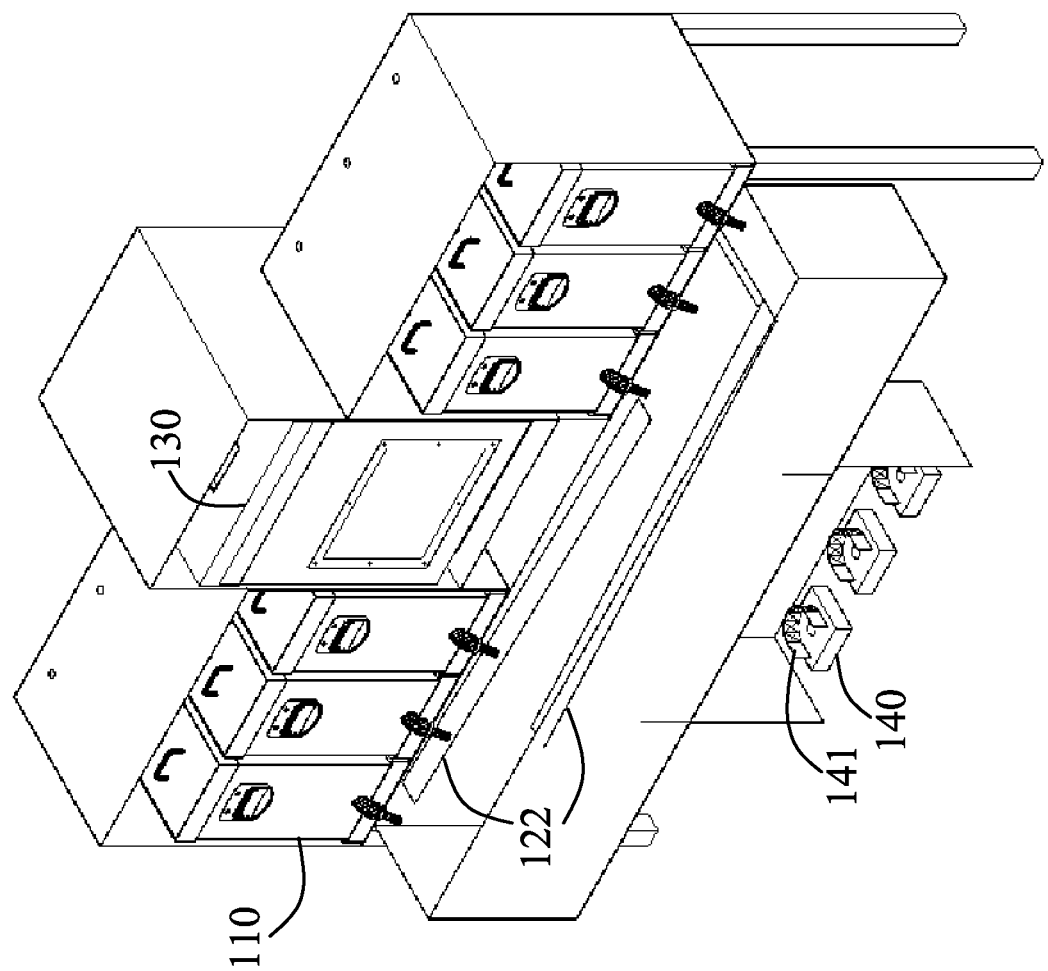
FIG. 1A illustrates a schematic view of the smart energy-saving device for automatic blending drinks of the present invention.
Figure 1B:
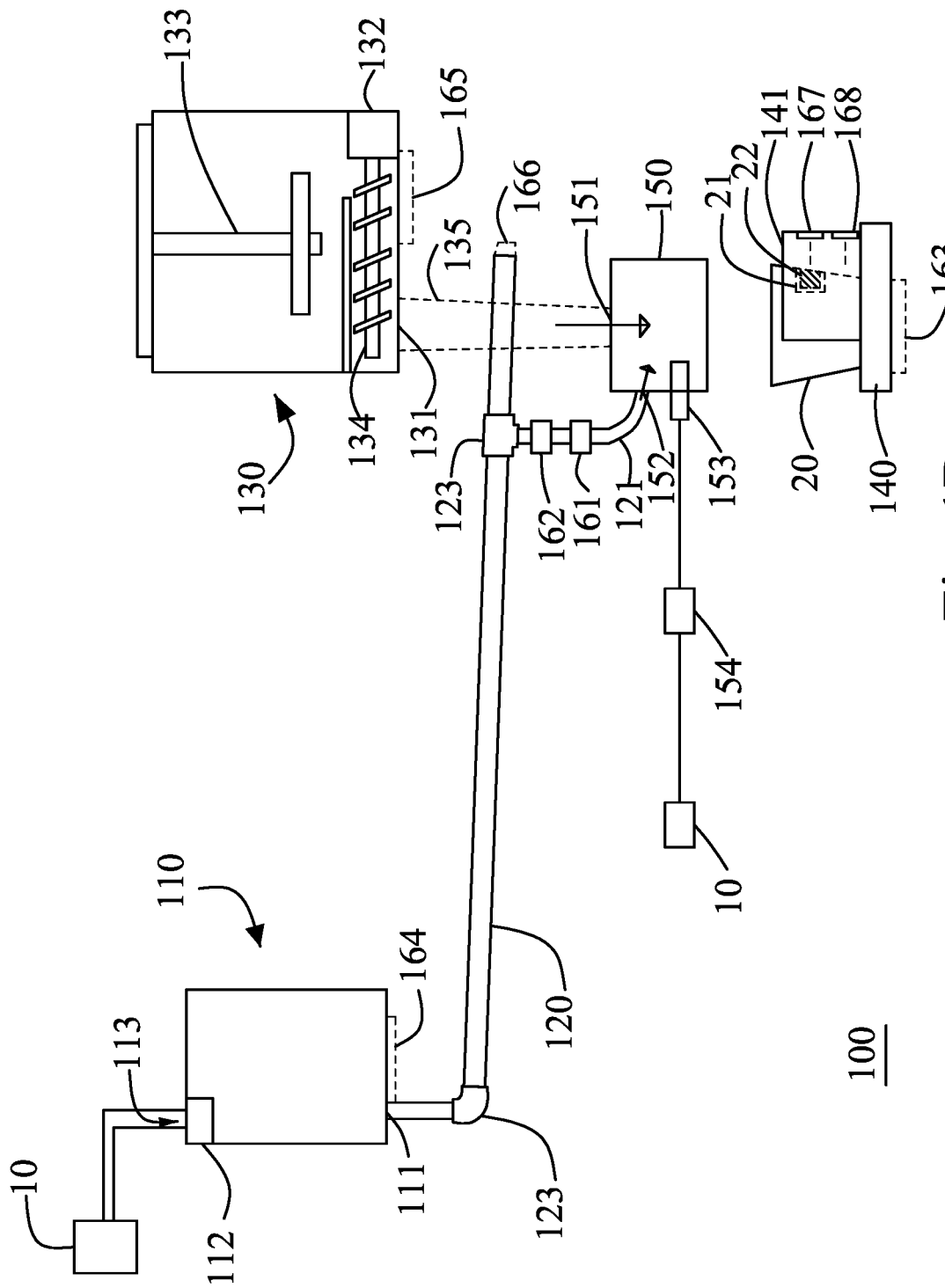
FIG. 1B a illustrates schematic structural view of the smart energy-saving device for automatic blending drinks of the present invention.

With reference to FIG. 1A and FIG. 1B, which illustrate a schematic view of the smart energy-saving device for automatic blending drinks of the present invention and a schematic structural view of the smart energy-saving device for automatic blending drinks of the present invention. Some parts of the smart energy-saving device 100 for automatic blending drinks are plural, in order to describe in detail. As shown in FIG. 1B, there is only one shown for each part with plural number. For a plurality of manifolds 120, etc., which are not shown in FIG. 1A as well. The smart energy-saving device 100 includes a plurality of beverage barrels 110, the plurality of manifolds 120, a plurality of ice-storing devices 130, a plurality of beverage stations 140, a plurality of collection mechanisms 150, and a control module.

The beverage barrel 110 mainly stores beverages for the present invention. The plurality of the beverage barrels 110 are to separately store different beverages or liquid ingredients to be ingredients for making beverages, such as fresh milk, tea, boiled water, sugar water, etc. The beverage barrel 110 further includes an outlet 111 that is disposed at a bottom of the beverage barrel 110. Preferably, the eight corners of the beverage barrel 110 are eight arc shapes in order to avoid beverage residues and facilitate cleaning.

The beverage barrel 110 further includes a water inlet 113, disposed beyond the beverage barrel 110 and connected with an outside water source, and a beverage barrel cleaning water valve switch 112, connected with the water inlet 113 in series. Outside cleaning water (preferably heated cleaning water) is introduced into the beverage barrel 110 as soon as the beverage barrel cleaning water valve switch 112 is opened, so as to clean the beverage barrel 110 and follow-up pipes.

The manifolds 120 are disposed beneath the beverage barrels 110 and connected with the outlets 111 of the beverage barrels 110. Further, the manifolds 120 are correspondingly arranged to be parallel to each other, and there is an angle between a horizontal line and an extension direction of the manifolds 120. Each of the manifolds 120 has a beverage tube 121 that is connected with a collection mechanism 150. As it can be seen, the beverages in the beverage barrel 110 goes to the collection mechanism 150 via the outlet 111, the manifold 120 and the beverage tube 121. According to FIG. 1A, the manifolds 120 are placed on a collection pipe support frame 122, in order to maintain the manifolds 120 along the horizontal direction. The manifolds 120 and the beverage tubes 121 are flexible tubes, but with hard material components such as metal at bend places and shunt places, wherein the hard material component can be an adapter.

The ice-storing device 130 is a device to store ice for the present invention. The ice-storing device 130 has at least one ice outlet 131, at least one servomotor 132, a stirring rod 133, and at least one thruster 134. The ice outlet 131 is disposed at a bottom of the ice-storing device 130, but it can be plural for another embodiment. A partition is placed between the two ice-storing devices 130 if the number of the ice-storing device 130 is plural, and therefore each of the ice-storing device 130 is going to correspond to each of the collection mechanisms 150. One end of the stirring rod 133 is disposed at a top of the ice-storing device 130, in order to constantly stir ice in the ice-storing device 130 for avoiding ice sticking.

The thruster 134 is horizontally disposed beyond the ice outlet 131 and connected with the servomotor 132. In Fact, the thruster 134 is a threaded rod and driven by the servomotor 132. As aforesaid, the ice is pushed by the thruster 134 and the servomotor 132 to move forward to the ice outlet 131. In practice, the numbers of the thruster 134 and the servomotor 132 can be plural and are corresponding to the number of the ice outlet 131. More, the numbers of the ice outlet 131, the servomotor 132 and the thruster 134 are the same as the collection mechanisms' 150.

The beverage station 140 is for placing a beverage cup 20 thereon, and therefore the beverage station 140 is beneath the collection mechanism 150. A U-shape structure 141 is on the beverage station 140, and it functions to keep the beverage cup 20 on a suitable position of the beverage station 140.

A label 21 has a bar code 22 thereon and is on the beverage cup 20, wherein the bar code 22 is printed by a sales information printing device, so the bar code 22 has beverage information such as commodity, sugar, ice quantity, etc., which is input by salesperson.

Figure 4:
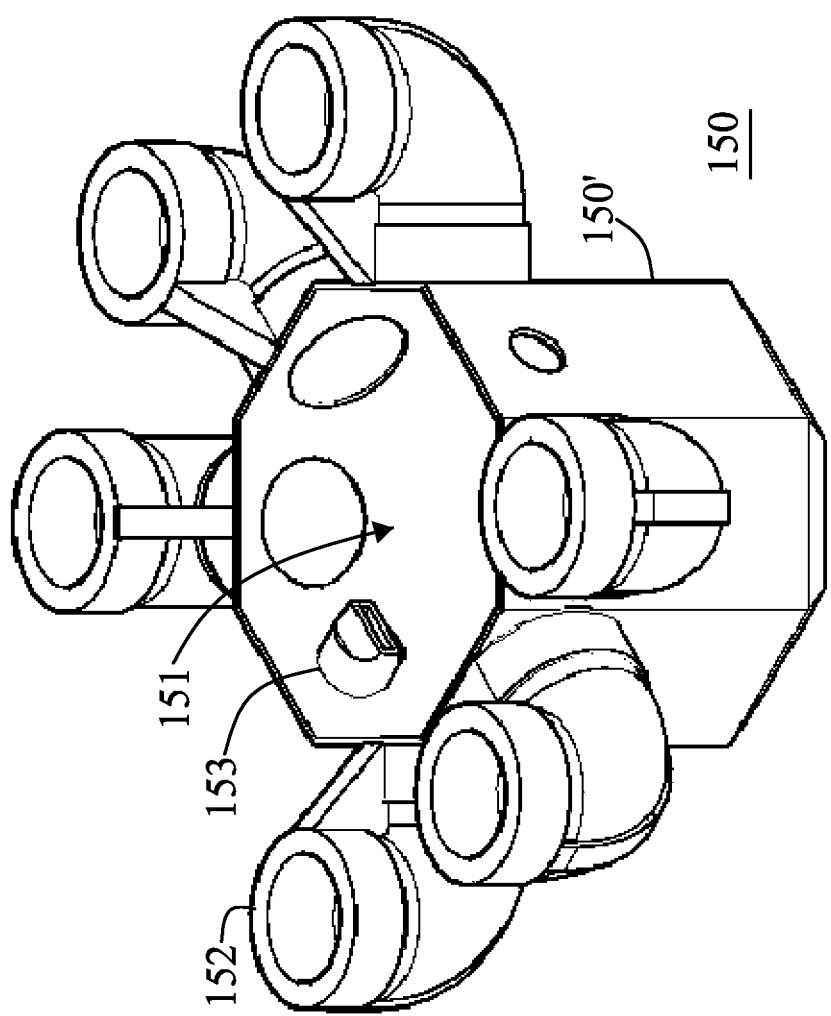
FIG. 4 illustrates a schematic view of a collection mechanism of the present invention.

The collection mechanisms 150 are disposed beyond the beverage stations 140 and function to collect the beverages in the beverage barrels 110 and the ice in the ice-storing device 130. As shown in FIG. 4, which illustrates a schematic view of the collection mechanism of the present invention. The collection mechanism 150 has a ring structure 150', an ice inlet 151, a plurality of water inlets 152, a plurality of nozzles 153, and a plurality of beverage tubes 121. The ring structure 150' is the main body of the collection mechanism 150, but it is an octagonal structure here. The ice inlet 151 is at the center of the ring structure 150' and connected with the ice outlet 131 of the ice-storing device 130 via a flexible tube 135.

The plurality of water inlets 152 are disposed on the ring structures 150', especially at the edges of the ring structures 150'. The water inlets 152 of each of the ring structures 150' are connected with the manifolds 120 respectively through the beverage tubes 121. In other words, the water inlets 152 are corresponding to the beverage barrels 110 individually. Beverages flow through the ring structures 150', and then to the beverage cup 20.

The nozzles 153 are disposed on the peripherals of the ring structure 150', and connected with a collection mechanism clean water valve switch 154 and an outside water source 11. Water from the outside water source 11 may flow through the nozzles 153 once the collection mechanism clean water valve switches 154 are activated. Each of the nozzles 153 with a narrow mouth is capable of cleaning the internal of the ring structure 150' for avoiding beverage residues.

Figure 1C:
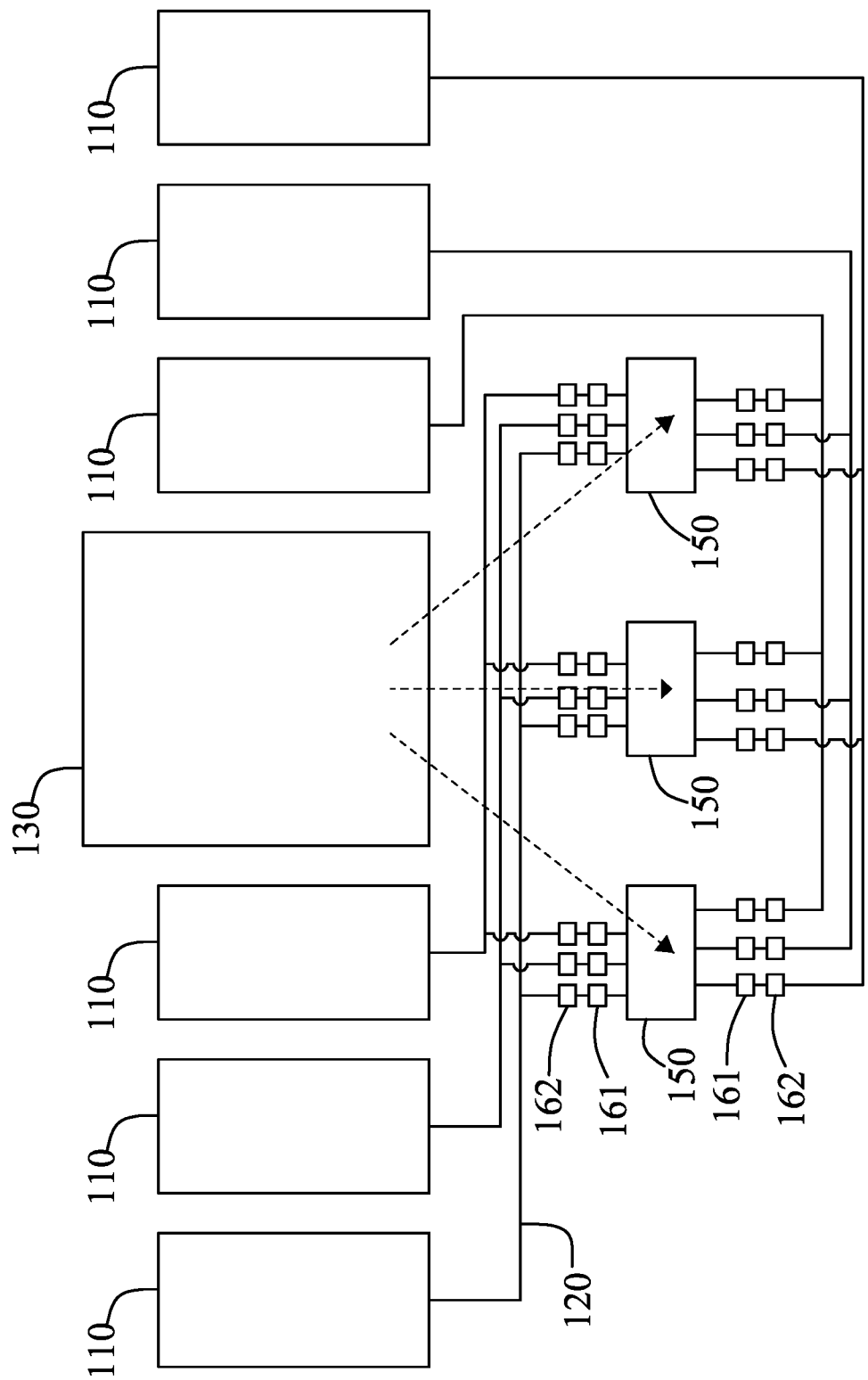
FIG. 1C illustrates a schematic view of tubes of the present invention.

Referring to FIG. 1C, which illustrates a schematic view of tubes of the present invention. For the embodiment, there are six beverage barrels 110 for reserving different kind of beverages or raw materials individually. Each of the beverage barrels 110 is connected with the horizontal manifold 120, and thus to the three collection mechanisms 150. As a conclusion, the six beverage barrels 110 are corresponding to the six manifolds 120, and the ice-storing device 130 is able to deliver ice to the ice inlet 151 of the collection mechanism 150.

Figure 2:
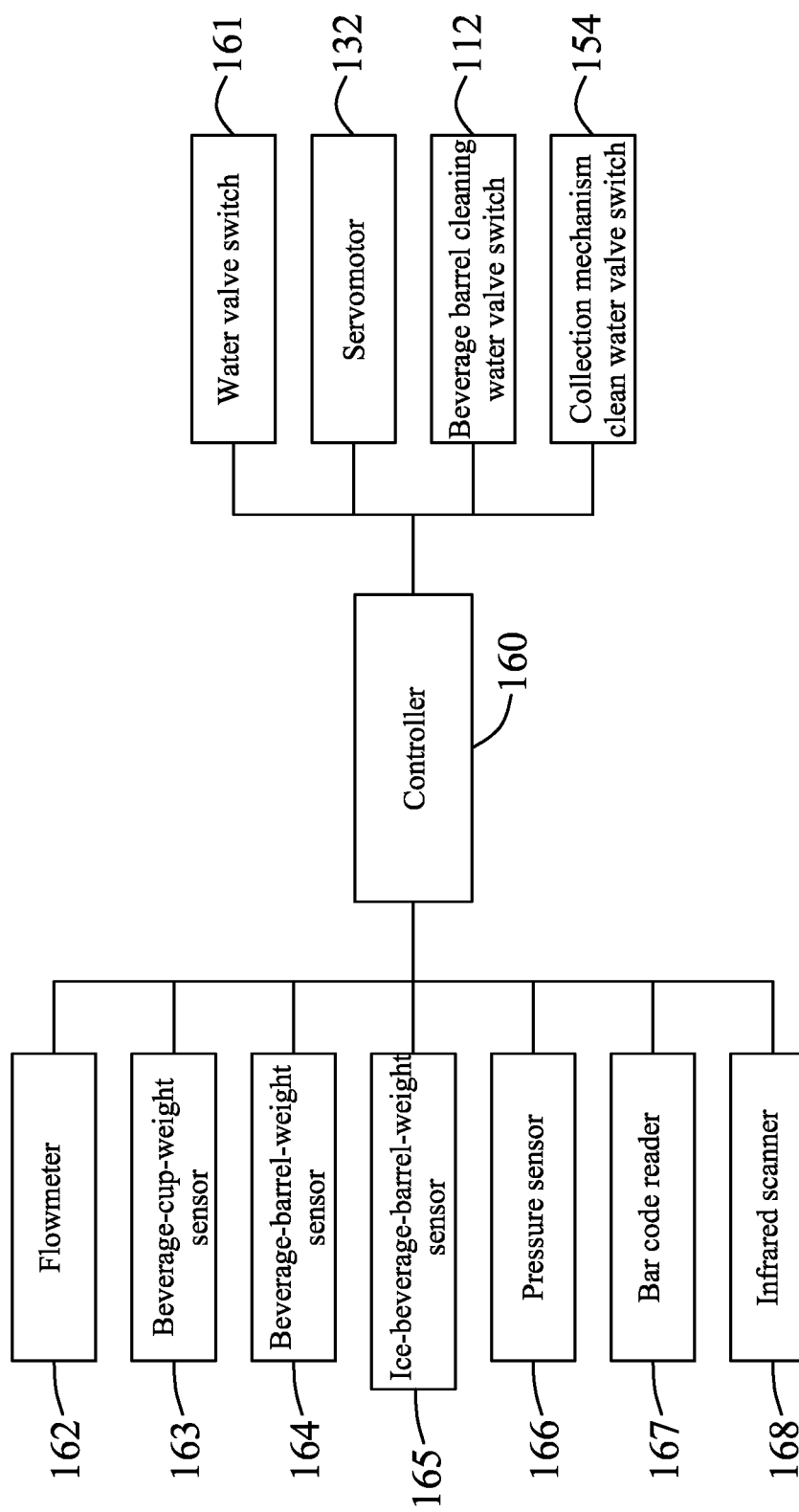
FIG. 2 illustrates a schematic structural view of a control module of the present invention.

The control module functions to be a main control system of the smart energy-saving device (100) for automatic blending drinks. According to FIG. 2, which illustrates a schematic structural view of the control module of the present invention. The control module has a controller 160, a plurality of water valve switches 161, a plurality of flowmeters 162, a plurality of beverage-cup-weight sensors 163, a plurality of beverage-barrel-weight sensors 164, an ice-beverage-barrel-weight sensor 165, a plurality of pressure sensors 166, a plurality of bar code readers 167, and a plurality of infrared scanners 168. Through aforesaid, the control module is able to automatically blend drinks/beverages.

A programmable control chip is an option for the controller 160, which is input a plurality of control modes, receives signals via sensors, and controls the water valve switches 161, the servomotors 132, a beverage barrel cleaning water valve switch 112, and a collection mechanism clean water valve switch 154. How to control in detail may be described later.

The water valve switch 161 and the flowmeter 162 are positioned on the beverage tube 121 of the manifold 120 and connected with each other in series. Both of them are electrically connected with the controller 160. The flowmeter 162 provides flow data, which is the amount of beverages flowing through the flowmeter 162. The water valve switch 161 is driven by the controller 160 to open or close.

The beverage-cup-weight sensors 163 is on the beverage station 140 in order to provide the weights of the beverage cup 20 and the beverages in the beverage cup 20. In another word, the beverage-cup-weight sensors 163 is adopted to produce a beverage-cup-weight datum. The beverage-barrel-weight sensors 164 is disposed at a bottom of the beverage barrel 110, and is adopted to measure the weights of the beverage barrel 110 and the beverage in the beverage barrel 110, which is a beverage stock amount in the beverage barrel 110. Hence, the beverage-barrel-weight sensors 164 is capable of providing a beverage-barrel-weight datum.

The ice-beverage-barrel-weight sensor 165 is disposed at the bottom of the ice-storing device 130 for measuring the weights of the ice-storing device 130 and the ice inside the ice-storing device 130, which is an ice stock amount in the ice-storing device 130. Therefore, the ice-beverage-barrel-weight sensor 165 is adopted to produce an ice-beverage-barrel-weight datum.

The pressure sensor 166 is disposed in the manifold 120 in order to detect a beverage pressure inside the manifold 120, so as to appear a beverage pressure datum.

The bar code reader 167 and the infrared scanner 168 are set at aside of the beverage station 140. For the present embodiment, both are on the U-shape structure 141. The bar code reader 167 is adopted to recognize the bar code 22 for acquiring beverage data. The infrared scanner 168 is designed to determine whether the beverage cup 20 is on the beverage station 40 and provide beverage-cup-position data.

The controller 160 is connected with the water valve switches 161, the flowmeters 162, the beverage-cup-weight sensors 163, the beverage-barrel-weight sensors 164, the ice-beverage-barrel-weight sensor 165, the infrared scanners 168, the pressure sensors 166, and the bar code readers 167, and receives the flow data, the beverage-cup-weight datum, the beverage-barrel-weight datum, the ice-beverage-barrel-weight datum, the beverage pressure datum, the beverage data, and the beverage-cup-position data, and simultaneously controls the plurality of water valve switches 161 and the servomotor 132 based on the flow data, the beverage-cup-weight datum, the beverage-barrel-weight datum, the ice-beverage-barrel-weight datum, the beverage pressure datum, the beverage data, and the beverage-cup-position data. That is to control the outflow amount of beverages and the outflow amount of ice.

The controller 160 stores a beverage list with beverage prescription. The controller 160 controls a beverage outflow amount and an ice outflow amount such as tea outflow amount, fresh milk outflow amount, sugar water outflow amount, ice cube outflow amount, etc. according to the corresponding beverage prescription of the beverage list after receiving an ordered beverage. More, the controller 160 can adjust outflow amounts of other liquid materials based on an ice cube amount, for example, normal amount, small amount, not needed, etc.

Figure 3:
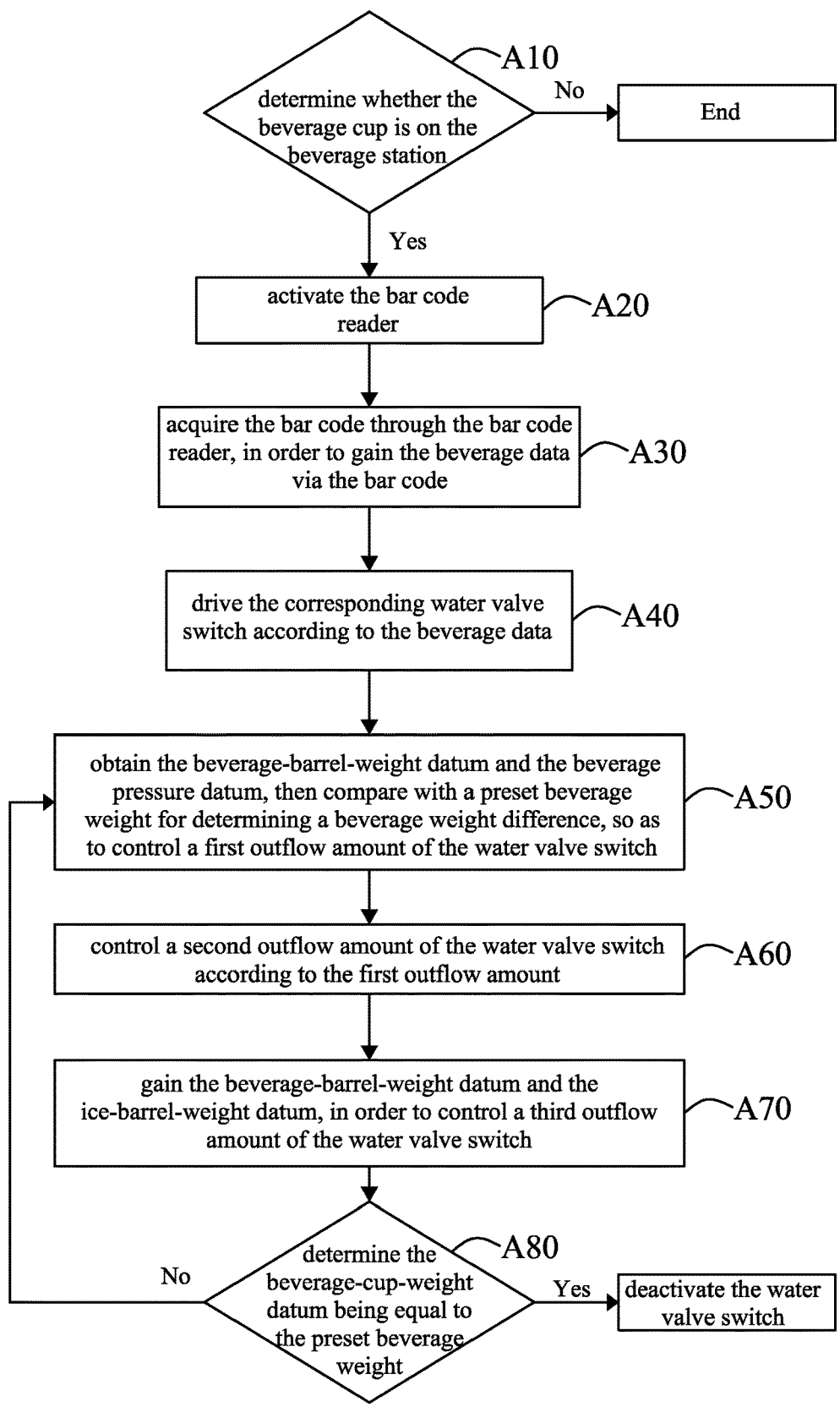
FIG. 3 illustrates a flowchart of a method for smart automatic blending drinks of the present invention.

Please refer to FIG. 3, which illustrates a flowchart of the method for smart automatic blending drinks of the present invention. For the present embodiment, the controller 60 improves the accuracy of controlling the beverage flow amount by calculating the data received. The method has the steps of:

(A10) receiving the beverage-cup-position data, in order to determine whether the beverage cup 20 is on the beverage station 140;

(A20) if yes, the beverage cup 20 being on the beverage station 140, and activating the bar code reader 167, otherwise, the beverage cup 20 being not on the beverage station 140, and ending;

(A30) acquiring the bar code 22 through the bar code reader 167, in order to gain the beverage data via the bar code 22;

(A40) driving the corresponding water valve switch 161 and the servomotor 132, wherein the corresponding water valve switch 161 of the corresponding beverage barrel 110, and the servomotor 132 of the ice-storing device 130, in order to thrust ice;

(A50) obtaining the beverage-barrel-weight datum and the beverage pressure datum, then comparing with a preset beverage weight for determining a beverage weight difference, so as to control a first outflow amount of the water valve switch 161, wherein compared the two references of the beverage amount (the beverage-barrel-weight datum) of flowing into the beverage cup 20 and the amount status (the beverage pressure datum of the manifold 120) of the beverage flowing out with the preset beverage weight, the beverage weight difference is determined, so that the first outflow amount can be further controlled;

(A60) controlling a second outflow amount of the water valve switch 161 according to the first outflow amount, wherein the water valve switch can be further controlled based on the beverage flow amount in the beverage tube 121;

(A70) gaining the beverage-barrel-weight datum and the ice-barrel-weight datum, in order to control a third outflow amount of the water valve switch 161; and (A80) determining the beverage-cup-weight datum being equal to the preset beverage weight, if no, repeating step (A50) to step (A80), otherwise, deactivating the water valve switch 161, wherein the weight of the beverage in the beverage cup 20 approaching the preset beverage weight is in determination, if no, loading the beverage being not finished yet, and repeating step (A50) to step (A80), so as to continuously control the amount of beverage flowing out, otherwise, the water valve switch 161 is deactivated to stop that of flowing out beverage.

For another embodiment, a step after step (A80) is that of: the controller 160 acquiring the beverage-cup-weight datum, and generating a beverage replenishment notification message if the beverage-cup-weight datum is less than a corresponding preset beverage-cup-weight datum. In other words, the situation of outflowing beverage is abnormal because of the pipelines are blocked or leaked, so as to inform an operator via the beverage replenishment notification message.

The smart energy-saving device (100) for automatic blending drinks further has a sealing machine. After step (A80), that is of loading beverage into the beverage cup 20 being completed and the beverage-cup-weight datum being equal to the preset beverage weight, the sealing machine is thus activated. As shown in FIG. 1A, the number of the sealing machines is equivalent to that of the beverage station 140. The sealing machines are behind the beverage stations 140 and below the ice-storing device 130. As soon as the sealing machine is driven, the beverage station 140 may go back into the device 100 in order to seal the beverage cup 20.

In addition, from step (A10) to step (A80), if any of the flow data, the beverage-cup-weight datum, the beverage-barrel-weight datum, the ice-beverage-barrel-weight datum, the beverage pressure datum, the beverage data, and the beverage-cup-position data is not received in a certain time period, the abnormality notification message may then be generated to the operator.

Through step (A10) to step (A80), after the water valve switch 161 being activated and some sensing data being processed by the controller, the outflow amount the water valve switch 161 is further corrected, so as to precisely control the outflow amount of beverages up to 2c.c.

The controller 160 also stores a plurality of preset beverage-barrel-weight data and a preset ice-barrel-weight datum, that is, the expected storage of the beverage barrel 110 and the ice-storing device 130. When the controller 160 receives the message of the beverage-barrel-weight datum being less than the preset beverage-barrel-weight datum, a message of beverage replenishment notification is generated to the operator; further, when the message of the ice-barrel-weight datum being less than the preset ice-barrel-weight datum is received, a message of ice replenishment notification is thus generated to the operator.

The device 100 further has a sound device such as trumpet or loudspeaker, in order to transmit the abnormality notification message, the beverage replenishment notification and the ice supplement notification. That is to say, the situations of insufficient beverages or ice cubes, or system abnormal happen, the sound device may let the operator know.

The device 100 further has a control interface that is connected with the controller 160. The control interface is adopted to input a system cleaning instruction and a collection mechanism cleaning instruction. The beverage barrel cleaning water valve switch 112 is activated as soon as the controller 160 receives the system cleaning instruction. Hence, the clean water in the water source 10 may enter into the beverage barrel 110 and the pipelines thereof for further cleaning the internal of the device 100. The same reason for following descriptions. The collection mechanism clean water valve switch 154 is activated as soon as the controller 160 receives the collection mechanism cleaning instruction. Hence, the clean water in the water source 10 may enter into the collection mechanism 150 and the pipelines thereof for further cleaning the internal of the collection mechanism 150. Especially, the clean water in the water source 10 may be filtered water with high temperature. That is, the collection mechanism 150 is cleaned regularly, in order to avoid mutual contamination of residual beverages.

The controller 160 calculates the number of beverage preparation cups, and when the number of beverage preparation cups reaches a certain number, the controller 160 automatically executes the collection mechanism cleaning instruction.

The device 100 further comprises a wireless communication module, which is connected with the controller 160 and adopted to transfer the ice-barrel-weight datum, the beverage-barrel-weight datum, the beverage-cup-position data, and the beverage data to an outside electronic device and an outside display. The electronic device is a smart phone as an example. The data from the device 100 are able to connect with the outside electronic device through the wireless communication module as a smart phone of a store manager, in order to let the store manager remotely monitor the stock of beverages. In addition, the data can be transferred to a large display for the clerk to know the stock of beverages at the very initial stage. The electronic device is able to input the system cleaning instruction and the collection mechanism cleaning instruction. That is to say, the device 100 is able to be cleaned via the wireless communication module.

When operating the device 100 of the present invention, the clerk operates a sales information printing device based on the customer's demands, the bar code 22 is generated through the sales information printing device, and then attached to the beverage cup 20. Continuously the beverage cup 20 is placed on the beverage station 140. The controller 160 of the device 100 determines whether the position of the beverage cup 20 is correct through the beverage-cup-weight sensor 163 and the infrared scanner 168, and then the barcode reader 167 is started to scan the bar code 22 if the position of the beverage cup 20 is correct.

The controller 160 obtains the beverage information by scanning the bar code 22, and controls the plurality of water valve switches 161 and the servomotors 132 in accordance with the beverage information for flowing out the beverage and ice cubes. Simultaneously, the controller 160 will respond to multiple sensors. As a matter of fact, the data from the sensors may feed back to the controller 160, so as to let the water valve switch 161 more accurately control the outflow amount of the beverages until the beverage preparation is completed.

The clerk or the store manager can monitor the amount of beverages in the device 100 by means of electronic device (smart phone or tablet PC) or large display (electronic billboard) in business hours. If no, the clerk or the store manager may be informed to refill relevant raw materials. In addition, the device 100 has a detection function to check whether the system is normal at any time. After closing, the clerk can input the system cleaning instruction through the electronic device (smart phone or tablet PC), so that the device 100 can automatically clean the beverage barrel and the pipelines thereof.

The smart energy-saving device 100 for automatic blending drinks of the present invention is able to finish preparations of beverages in a single station without conveyor, mechanical arm, etc. Therefore, the present invention obviously promotes efficiency and energy-saving. By way of the multiple sensors, the beverage is being prepared, simultaneously the output amount of the beverages is controlled by means of a feedback function, so as to more accurately control the output amount of the beverages. Besides, the functions of fault detection and automatic cleaning are provided as well. As aforesaid, the present invention is very suitable to beverage shops.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:

1. A smart energy-saving device for automatic blending drinks, adopted to inject beverages into at least one beverage cup that comprises a bar code, comprising:
    a plurality of beverage barrels, each having at least one outlet disposed at a plurality of bottoms of the beverage barrels;
    a plurality of manifolds, connected with the outlet, arranged to be parallel to each other, and an angle between a horizontal line and an extension direction of the manifolds;
    at least one ice-storing device, comprising:
        at least one ice outlet, disposed at a bottom of the ice-storing device;
        at least one servomotor;
        a stirring rod, one end thereof disposed at a top of the ice-storing device; and
        at least one thruster, horizontally disposed beyond the ice outlet and connected with the servomotor;
    a plurality of beverage stations, each being suitable for placing the beverage cup thereon and having a U-shape structure;
    a plurality of collection mechanisms, disposed beyond the beverage stations, comprising:
        a plurality of ring structures;
        a plurality of ice inlets, each being disposed at a top of the ring structure and connected with the ice outlet;
        a plurality of water inlets, each being disposed on a side of the ring structures; and
        a plurality of beverage tubes, both ends of each of the beverage tube being connected with the water inlet and the manifold respectively; and
    a control module, comprising:
        a plurality of flowmeters, each being disposed on the beverage tube and adopted to produce flow data;
        a plurality of water valve switches, each being disposed on the beverage tube and connected with the flowmeter in series;
        a plurality of beverage-cup-weight sensors, each being disposed on the beverage station and adopted to produce a beverage-cup-weight datum;
        a plurality of beverage-barrel-weight sensors, each being disposed at a bottom of the beverage barrel and adopted to produce a beverage-barrel-weight datum;
        at least one ice-beverage-barrel-weight sensor, disposed at the bottom of the ice-storing device and adopted to produce an ice-beverage-barrel-weight datum;
        a plurality of pressure sensors, each being disposed in the manifold and adopted to produce a beverage pressure datum;
        a plurality of bar code readers, each being disposed on the U-shape structure and adopted to recognize the bar code for acquiring beverage data;
        a plurality of infrared scanners, each being disposed on the U-shape structure and adopted to produce beverage-cup-position data; and
        a controller, connected with the water valve switches, the flowmeters, the beverage-cup-weight sensors, the beverage-barrel-weight sensors, the ice-beverage-barrel-weight sensor, the infrared scanners, the pressure sensors, and the bar code readers, and receiving the flow data, the beverage-cup-weight datum, the beverage-barrel-weight datum, the ice-beverage-barrel-weight datum, the beverage pressure datum, the beverage data, and the beverage-cup-position data, and simultaneously controlling the plurality of water valve switches and the servomotor based on the flow data, the beverage-cup-weight datum, the beverage-barrel-weight datum, the ice-beverage-barrel-weight datum, the beverage pressure datum, the beverage data, and the beverage-cup-position data;
    wherein each of the beverage barrels is connected with the plurality of collection mechanisms through the single manifold.

2. The smart energy-saving device for automatic blending drinks according to claim 1 further comprises a sealing machine, which is disposed behind the beverage stations and below the ice-storing device.

3. The smart energy-saving device for automatic blending drinks according to claim 1 further comprises a sound device, which is connected to the controller and adopted to play a beverage replenishment notification message, an ice replenishment notification message, and an abnormality notification message.

4. The smart energy-saving device for automatic blending drinks according to claim 1, wherein the beverage barrel further has a water inlet, disposed beyond the beverage barrel and connected with an outside water source, and a beverage barrel cleaning water valve switch, connected with the water inlet in series, wherein the controller is electrically connected with the beverage barrel cleaning water valve switch, so that the beverage barrel cleaning water valve switch is activated as soon as the controller receives a system cleaning instruction.

5. The smart energy-saving device for automatic blending drinks according to claim 1, wherein each of the collection mechanisms further comprises a plurality of nozzles and a collection mechanism clean water valve switch, the nozzle being disposed on the ring structure and connected with an outside water source, the collection mechanism clean water valve switch being connected with the nozzle in series, so that the collection mechanism clean water valve switch is activated as soon as the controller receives a collection mechanism cleaning instruction.

6. The smart energy-saving device for automatic blending drinks according to claim 1 further comprises a sales information printing device, which is adopted to input the beverages and generate the bar code, wherein the bar code is printed on a label.

7. The smart energy-saving device for automatic blending drinks according to claim 1 further comprises a wireless communication module, which is connected with the controller and adopted to transfer the ice-barrel-weight datum, the beverage-barrel-weight datum, the beverage-cup-position data, and the beverage data to an outside electronic device and an outside display.

8. The smart energy-saving device for automatic blending drinks according to claim 1, wherein the ice outlet, the servomotor and the thruster are multiple and the same number.

9. A method for smart automatic blending drinks comprising the steps of:
- (A10) providing the smart energy-saving device of claim 1, and receiving the beverage-cup-position data, in order to determine whether the beverage cup is on the beverage station;
- (A20) if yes, activating the bar code reader;
- (A30) acquiring the bar code through the bar code reader, in order to gain the beverage data via the bar code;
- (A40) driving the corresponding water valve switch and the servomotor;
- (A50) obtaining the beverage-barrel-weight datum and the beverage pressure datum, then comparing with a preset beverage weight for determining a beverage weight difference, so as to control a first outflow amount of the water valve switch;
- (A60) controlling a second outflow amount of the water valve switch according to the first outflow amount;
- (A70) gaining the beverage-barrel-weight datum and the ice-barrel-weight datum, in order to control a third outflow amount of the water valve switch; and
- (A80) determining the beverage-cup-weight datum being equal to the preset beverage weight, if no, repeating step (A50) to step (A80), otherwise, deactivating the water valve switch.

10. The method for smart automatic blending drinks according to claim 9 further comprising the steps of:
- acquiring the beverage-barrel-weight datum, and generating a beverage replenishment notification message if the beverage-barrel-weight datum is less than a corresponding preset beverage-barrel-weight datum;
- acquiring the ice-barrel-weight datum, and generating an ice replenishment notification message if the ice-barrel-weight datum is less than a preset ice-barrel-weight datum;
- acquiring the beverage-cup-weight datum after step (A80), and generating an abnormality notification message if the beverage-cup-weight datum is less than a corresponding preset beverage-cup-weight datum; and
- generating the abnormality notification message from step (A10) to step (A80), if any of the flow data, the beverage-cup-weight datum, the beverage-barrel-weight datum, the ice-beverage-barrel-weight datum, the beverage pressure datum, the beverage data, and the beverage-cup-position data is not received in a certain time period.

* * * * *